Dec. 23, 1958 N. W. BELL 2,866,018

DIRECT CURRENT DIFFERENTIAL AMPLIFYING SYSTEM

Filed Aug. 13, 1956 2 Sheets-Sheet 1

INVENTOR.
NORTON W. BELL
BY
Christie, Parker & Hale
ATTORNEYS

Dec. 23, 1958 N. W. BELL 2,866,018

DIRECT CURRENT DIFFERENTIAL AMPLIFYING SYSTEM

Filed Aug. 13, 1956 2 Sheets-Sheet 2

INVENTOR.
NORTON W. BELL

BY

Christie, Parker & Hale
ATTORNEYS 2,866,018

DIRECT CURRENT DIFFERENTIAL AMPLIFYING SYSTEM

Norton W. Bell, Monrovia, Calif., assignor to Consolidated Electrodynamics Corporation, Pasadena, Calif., a corporation of California Application August 13, 1956, Serial No. 603,499

2 Claims. (Cl. 179—171)

This invention relates to arrangements for compensating for drift in direct current differential amplifying systems.

In electronic control and instrumentation, signals are often encountered which are very small in magnitude. It is necessary to amplify these small direct currents several hundredfold or more. In such amplification systems, drift of the system affects its accuracy and it is desirable to minimize or compensate for the effect of drift.

Drift may arise by any of the following:

(1) Small change in D. C. supply voltages.
(2) Small change in cathode temperature.
(3) Small change in cathode work function.
(4) Small change in contact potentials in the tube.
(5) Magnetic fields near the tube.
(6) Warping of tube electrodes with age and change in temperature.

Any one of these causes of drift results in a change in anode current. This anode current change in a high gain D. C. amplifier can change the voltage across the load. With small input signals, the magnitude of the drift with respect to the magnitude of the input signals may be quite large. The signals from thermocouples, phototubes operating on low-intensity light, and strain gauges are of this type. There are countless other instances.

A differential direct current amplifier is ordinarily provided with a balanced input circuit with the input terminals being at a potential which is different from ground. The potential which is common to the two input terminals is referred to as the "common mode" voltage, and the potential of the two input terminals with respect to one another is referred to as the "normal mode" voltage. The normal mode signal is amplified by the amplifier, and it is desirable to minimize the effect of the common mode voltage on the output which is produced by the amplifier.

Drift in a direct current amplifier may be compensated for by providing a correction signal which corresponds to the drift and by employing this correction signal to control the gain of the amplifier. However, such a correction signal is difficult to provide in a differential amplifier system because of the variations in the common mode voltage which is applied to the two input terminals of the amplifier.

This difficulty is overcome in the present invention by comparing the signal which is applied to the input of the differential amplifier with an attentuated version of the signal which is produced at the output of the differential amplifier to produce a signal which corresponds to the drift of the differential amplifier. This signal is applied to a chopper amplifier which provides a control signal which is employed to activate apparatus which controls the gain of the differential amplifier. The chopper amplifier does not respond to common mode voltage at the input of the differential amplifier and hence the control signal which controls the gain of the differential amplifier is not affected by the common mode voltage.

Also, chopper amplifiers are relatively free from the effects of drift, and the use of a chopper amplifier in the correction circuit minimizes the amount of drift which is produced in the circuit which provides the correction signal.

A better understanding of the present invention and its advantages may be had upon a reading of the following detailed description when taken in connection with the drawings, in which.

Figure 1:
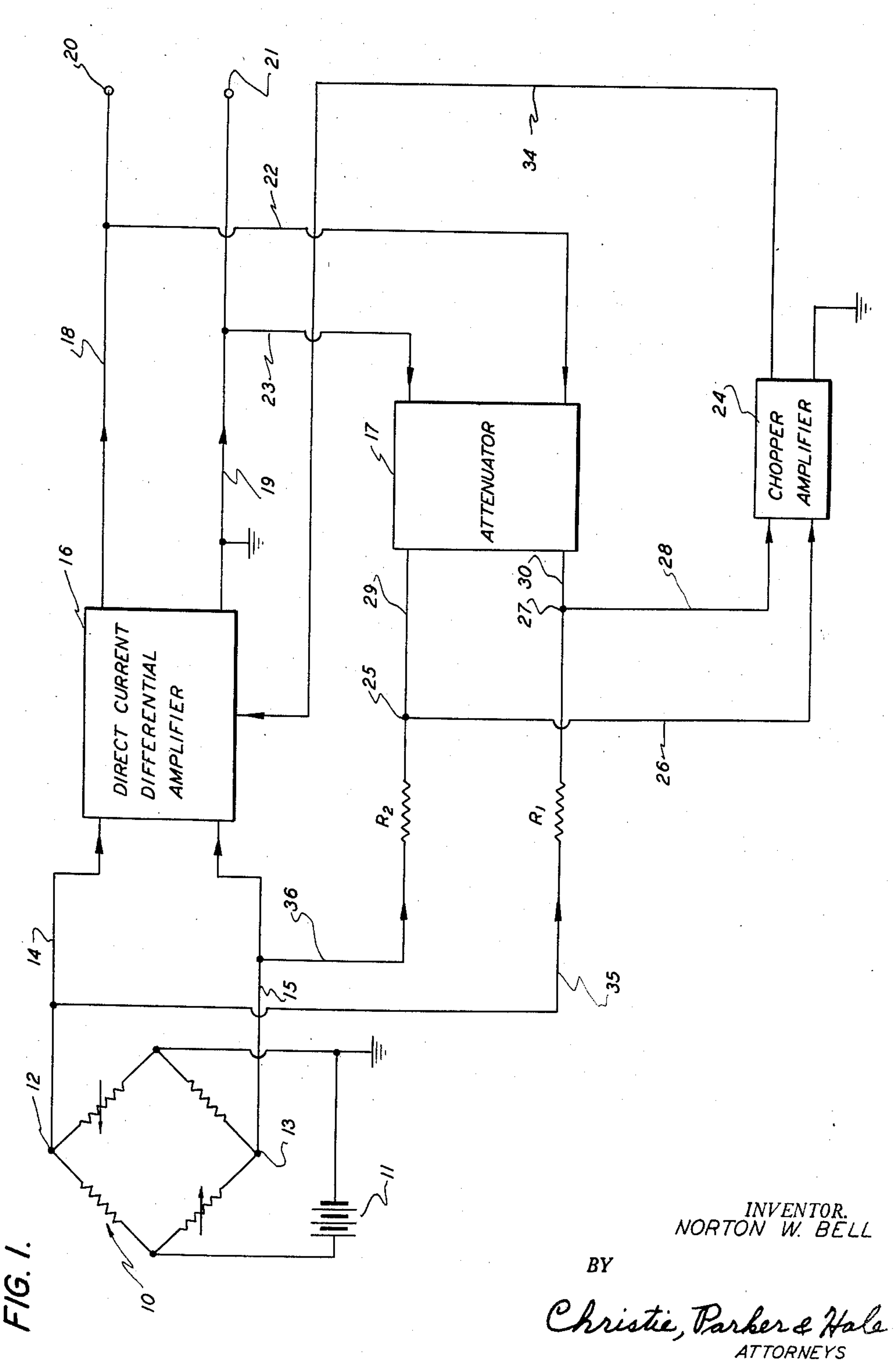
Fig. 1 is a block diagram showing the arrangement for drift compensation.

Referring to Fig. 1, a source 10 emits small signal variations which are to be amplified. By way of example, this source may be a strain guage bridge circuit having a battery voltage supply 11. Four resistance arms are included as part of the bridge circuit. Two of the arms are variable in response to strains (as indicated by the arrows).

If a ten volt battery is used as the voltage source 11, the voltages at each of junctions 12 and 13 with respect to ground may consist of a five volt component and a voltage component caused by strains which vary above and below the five volts. The five volt component is termed the common mode voltage and the varying voltage is called the normal mode voltage. The common mode components are in-phase and the normal mode components are out-of-phase.

The signals from junctions 12 and 13 are conducted through leads 14 and 15 to a direct current differential amplifier 16 having several stages. The signals are amplified by the amplifier and the output signals are conducted through leads 18 and 19 to output terminals 20 and 21. The amplified voltage across terminals 20 and 21 is of opposite polarity to the voltage at junction 12 minus the voltage at junction 13.

Coupled to the output lead 18 is a lead 22 and coupled to input lead 14 is a lead 35 which includes a resistance $R_1$. Connected to output lead 19 is a lead 23 and coupled to input lead 15 is a lead 36 which includes a resistance $R_2$.

An attenuator 17 is also connected to leads 22 and 23. The attenuator provides an output signal which is attenuated by approximately the factor $$\frac{1}{K}$$

where K is the gain of the differential amplifier 16. The attenuated signal appears across leads 29 and 30.

A chopper amplifier 24 is connected to the lead 36 at point 25 by means of lead 26. The chopper amplifier 24 is also connected to lead 35 at point 27 by means of lead 28.

The voltages from junctions 12 and 13 with respect to ground are conducted through leads 14 and 15 to the differential amplifier 16. The same voltages are fed through leads 35 and 36 to the junction points 27 and 25. The amplified voltage output across leads 18 and 19 is conducted through leads 22 and 23 to the attenuator. If there is no drift, this output signal is equal to $$e_0 = -k(e_1 - e_2)$$

where $k$ is a constant, $e_1$ is the voltage at junction 12 and $e_2$ the voltage at junction 13. Since the attenuator decreases the output signal by approximately the gain of the differential amplifier, the voltage output from attenuator 17 will be of the same magnitude as the voltage at junction 12 with respect to ground minus the voltage at junction 13 with respect to ground if no drift exists; however, the attenuator output is of opposite polarity. Hence, if there is no drift, no current flows to chopper amplifier 24.

If drift is present, the potential at connection point 25 will be different from the potential at connection point 27, and D. C. signals will be conducted to the direct current chopper amplifier. The resulting output from the chopper amplifier is applied as a drift compensation signal through lead 34 to the direct current differential amplifier.

Because of the great drift stability of the chopper amplifier, the chopper amplifier contributes very little drift to the system. Therefore, the use of a chopper amplifier to compensate for drift in the tubes, produces much better results than the use of electronic tubes or other devices. The drift in tubes often amounts to $$\frac{10 \text{ millivolts}}{\text{percent heater change}}$$

whereas the drift of an ordinary chopper amplifier amounts to a maximum of only 10 microvolts. Since only drift signals appear across the chopper amplifier, it can easily handle the drift, which is slowly varying.

Many different types of chopper amplifiers may be used to apply the drift correction. Also, the drift correction may be applied at any of many different points of the differential amplifier system. Different attenuator systems may also be used.

Figure 2:
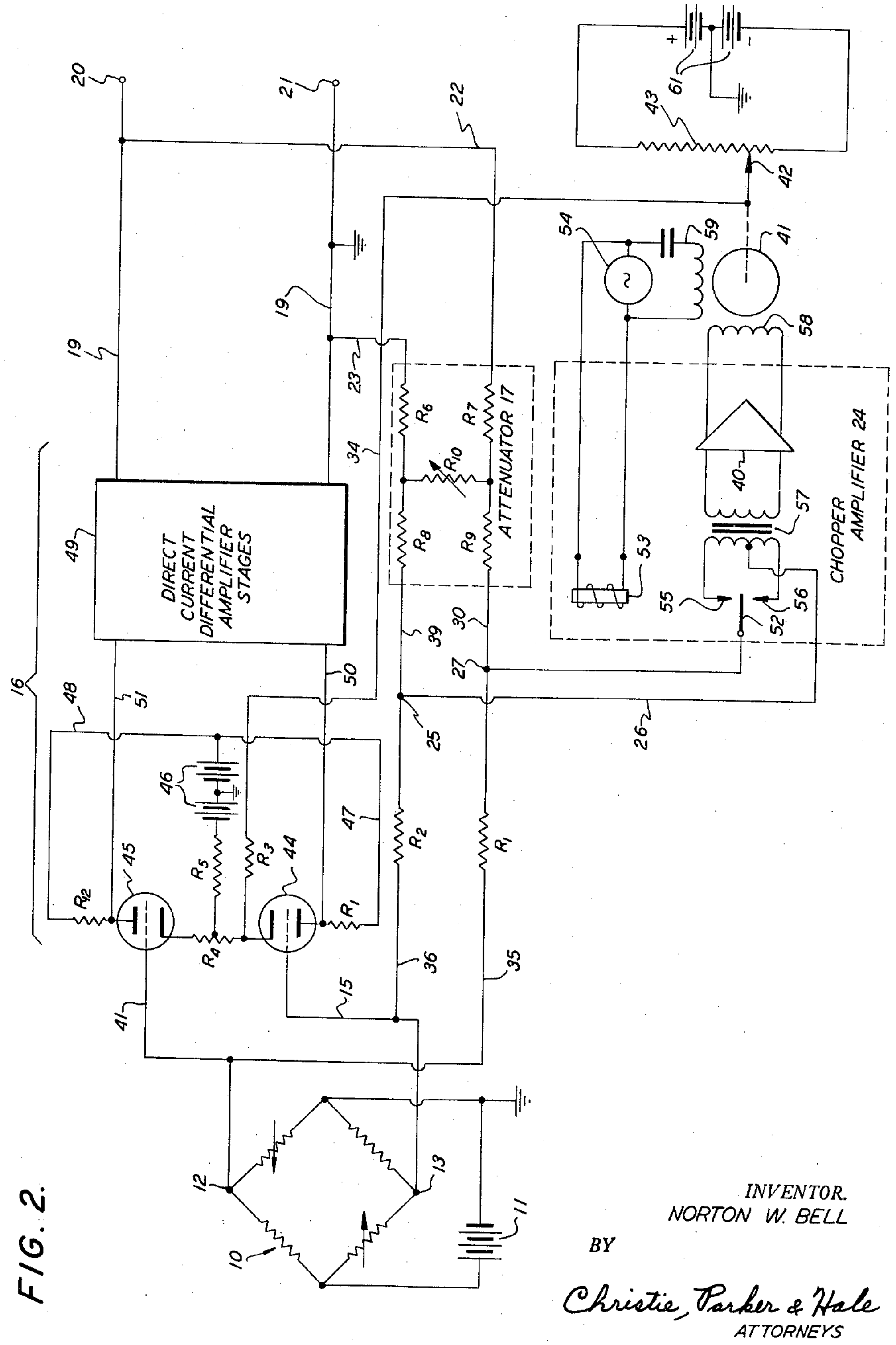
Fig. 2 is a schematic and block diagram showing the details of the circuit of Fig. 1.

Fig. 2 is one example showing the chopper amplifier used to control a motor. The motor controls the amount of drift compensation signal. The drift compensation signal is fed to the cathodes of the tubes in the input stage of the differential amplifier. The attenuator is shown as an H-type attenuator.

The chopper amplifier serves to control a motor actuator 41. Actuator 41 moves the wiper 42 of a potentiometer along a resistance 43. The movement of wiper 42 controls the amount and polarity of voltage fed to the cathodes of electronic tubes 44 and 45, through lead 34 and a large resistance $R_3$. The potentiometer resistance 43 is suplied with voltage by a source 61 which has a positive terminal voltage of say, +250 volts with respect to ground and a negative terminal voltage of say, −250 volts with respect to ground.

A reed 52 is connected to lead 28. The reed 52 is caused to vibrate by an electromagnet 53 which is controlled by an alternating current source 54. The reed 52 alternately engages contacts 55 and 56 connected to the primary winding of a transformer 57. Lead 26 is connected to the center tap of the primary winding of the transformer 57.

The actuator 41 is shown as a two-phase motor with one winding 58 being connected to the output of an alternating current amplifier 40 and the other winding 59 being connected to the source 54 of alternating current. Thus, if drift exists in the direct current amplifier ssytem the polarized D. C. signal in leads 26 and 28 is converted by the reed 52 and the transformer 57 to a properly phased A. C. signal which is amplified by the amplified 40 and fed to the winding 58 of the motor. The two-phase motor then moves the wiper arm 42 along the resistance 43 to cause a drift compensation signal to be applied to the cathodes of tubes 44 and 45, with the drift compensation signal having a magnitude and a polarity which change the gain of the tubes 44 and 45 so as to reduce the signal which is applied to the input of the chopper amplifier to zero. This change in the gain of the tubes 44 and 45 corrects for the drift which is produced by the differential amplifier 16.

The H-type attenuator includes resistances $R_6$, $R_7$, $R_8$, $R_9$ and variable resistance $R_{10}$. The value of these resistances and resistances $R_1$ and $R_2$ are chosen so that no current will flow to the chopepr amplifier unless drift occurs. The plate circuit voltage for the tubes 44 and 45 is provided by a source 46. The source 46 has its positive terminal coupled to the plates of tubes 44 and 45 through leads 47 and 48 and resistances $R_{11}$ and $R_{12}$, respectively. The output from tubes 44 and 45 is coupled to the next stage of the direct current differential amplifier stages 49 by leads 50 and 51.

The following values have been used with a direct current differential amplifier having a gain of $10^4$:

| | |
|---|---|
| $R_1$, $R_2$ | 5,000 ohms each. |
| $R_3$ | 10 megohms. |
| $R_4$ | 470 ohms. |
| $R_5$ | 830,000 ohms. |
| $R_6$, $R_7$, $R_8$, $R_9$, $R_{10}$ | 1.5 megohms each. |
| $R_{11}$, $R_{12}$ | 40,000 ohms each. |

The source of potential 46 and the potentiometer source of potential 61 each had a positive terminal at +250 volts with respect to ground and a negative terminal at −250 volts with respect to ground, and the tubes 44 and 45 were type CK5755.

I claim:

1. In an electrical direct current differential amplifier system including at least one differential amplifier stage having a pair of electronic tubes with each tube including an anode, grid and cathode, the improvement which comprises means for feeding one of two input signals to the grid of one of said pair of electronic tubes and the other of the two signals to the grid of the other tube of said pair of electronic tubes, an output circuit for each electronic tube, the output circuit of each tube being coupled to the anode, an attenuator having an input side coupled to the output circuits of said pair of electronic tubes and an output side coupled to the two input signals, a chopper amplifier having an input and an output, the input of said chopper amplifier being connected to the output side of said attenuator, an electric motor, means coupling the output of said chopper amplifier to said electric motor, a voltage divider network including a moveable tap, means connecting said electric motor to drive said moveable tap, means coupling the potential at said electrical tap to the cathodes of said pair of electronic tubes, whereby any signal difference between the input signal and the output signal taken from the output side of said attenuator causes said chopper amplifier to operate said electric motor to change the moveable tap and thereby change the cathode potential of said pair of electronic tubes until the input signal to said pair of electronic tubes and the output signal of said attenuator are equal.

2. An electrical direct current differential amplifier system including at least one differential amplifier stage having a pair of electronic tubes, each tube including an anode, grid and cathode, the improvement which comprises means for feeding one input signal to one grid and a second input signal to the other grid of said pair of electronic tubes, an output circuit coupled to said pair of electronic tubes, an attenuator network, a chopper amplifier, said attenuator network being coupled between the output circuit of said electronic tubes and said chopper amplifier, said attenuator network serving to reduce the output signal by a factor equal to the amplification in said electronic tubes, means coupling said input signals to the junction of the attenuator and the chopper amplifier, an electric motor coupled to the output of said chopper amplifier, a variable voltage device having a moveable tap coupled to said electric motor, means coupling the potential at said movable tap to the cathodes of said pair of electronic tubes whereby said chopper amplifier and electric motor are operated to reduce the signal at the input of said chopper amplifier to zero.

References Cited in the file of this patent

UNITED STATES PATENTS

| | | |
|---|---|---|
| 2,619,552 | Kerns | Nov. 25, 1952 |
| 2,709,205 | Colls | May 24, 1955 |
| 2,714,136 | Greenwood | July 26, 1955 |

FOREIGN PATENTS

| | | |
|---|---|---|
| 620,140 | Great Britain | Mar. 21, 1949 |